June 3, 1958  J. C. BUDDE  2,837,282
WATER MIXING VALVE
Filed June 8, 1956
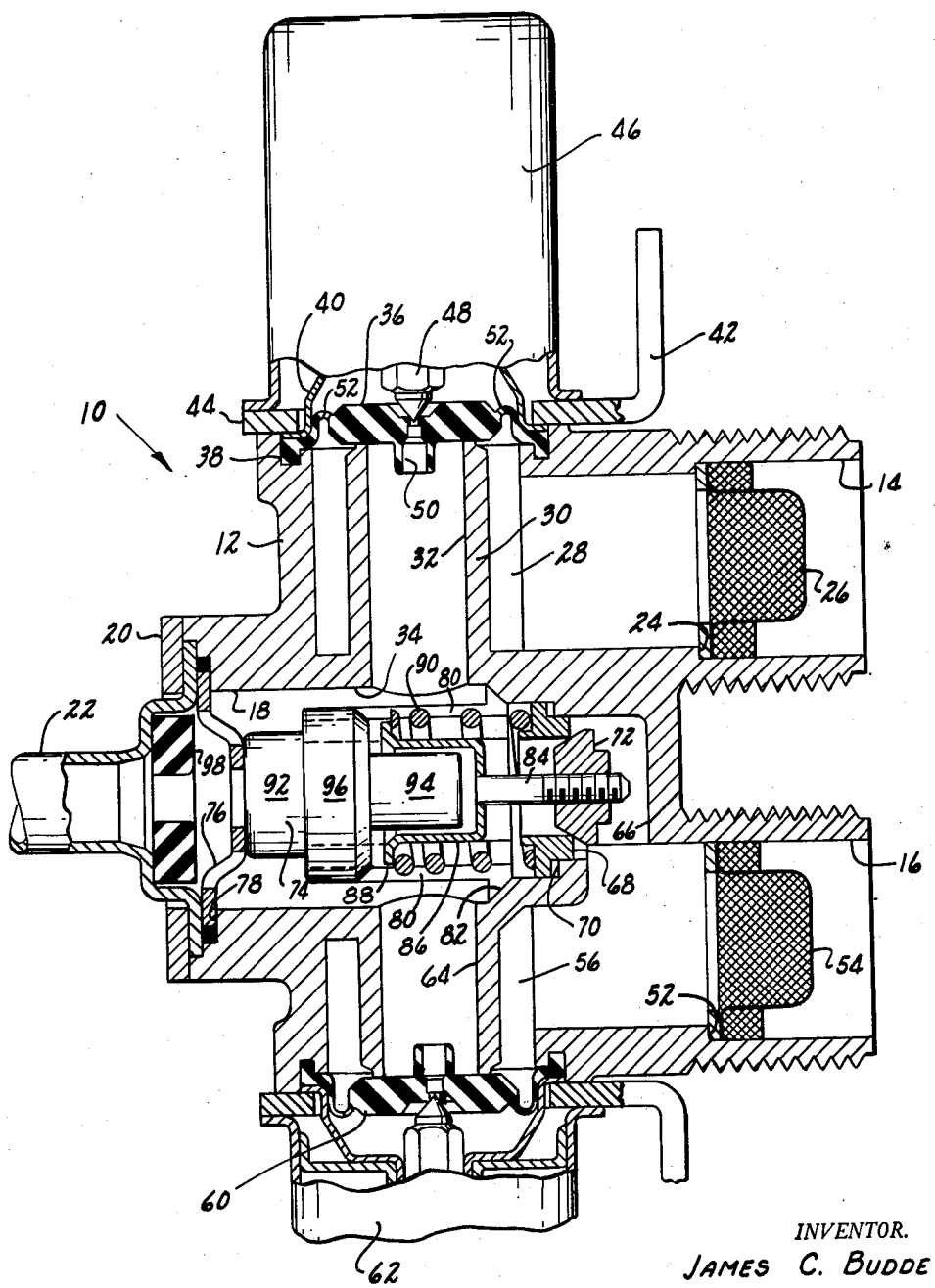
INVENTOR.
JAMES C. BUDDE
BY
SMITH, OLSEN, LEWIS & McRAE
ATTORNEYS United States Patent Office 2,837,282
Patented June 3, 1958

2,837,282

WATER MIXING VALVE

James Clarence Budde, Detroit, Mich., assignor, by mesne assignments, to American Radiator & Standard Sanitary Corporation, New York, N. Y., a corporation of Delaware Application June 8, 1956, Serial No. 590,243

8 Claims. (Cl. 236—12)

The present invention relates to improvements in fluid mixing valves for mixing hot and cold fluids and delivering them below a predetermined temperature.

In constructing mixing valves for use in home appliances and the like, it is necessary that such valves be constructed for a comparatively low cost, and at the same time, so that they will meet the high standards expected by the purchasers and users of such appliances. The desire to reduce cost has lead to the use in many instances of mixing valves from which thermostatic control means have been entirely eliminated. This step naturally occurred because of the added costs involved in making and installing such thermostatic controls.

However, it has been found that variations in the hot and cold water pressure to an automatic washing machine using a non-thermostatic type of valve frequently results in water temperatures which are too high for use with some of the synthetic fabrics being washed. Therefore, it has been found necessary to develop a mixing valve for this purpose which has the low cost features of non-thermostatic valves, and which will limit the maximum temperature of the mixed water discharged from such valve.

It is an object of the present invention to provide an improved fluid mixing valve which is characterized by its relatively simple, low cost construction and effective operation.

It is another object of the present invention to provide an improved mixing valve of the foregoing character which is constructed and arranged so that it will operate as a non-thermostatic unit below a predetermined maximum temperature, and which includes a simple, relatively low cost temperature control assembly for preventing the discharge temperature of the mixed fluid from exceeding said predetermined maximum temperature.

It is still another object of the present invention to provide an improved fluid mixing valve of the foregoing character which has flow control means for maintaining fluid discharge at a substantially uniform rate.

Other objects of this invention will appear in the following description and appended claims, reference being had to the accompanying drawings forming a part of this specification wherein like reference characters designate corresponding parts in the several views.

In the drawings:

The figure illustrates a preferred embodiment of the invention, partially in section and with portions broken away.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, a detailed description of the invention will be given. A mixing valve 10 is shown having a valve body 12, on one side of which are two inlets 14 and 16, respectively, for the hot and cold fluids. The opposite side of the valve body 12 has a single discharge outlet 18 and a retainer 20 for securing the outlet member 22 to the valve body. Any suitable means (not shown) may be employed for fastening retainer 20 to valve body 12.

The hot water inlet 14 has a shoulder 24 against which is seated a screen element 26. The inlet 14 communicates with an annular passageway 28 opening to one end of the valve body 12 and extending around an integral sleeve 30. The latter also opens to the end of valve body 12 and the interior forms a hot water passageway 32 communicating with the mixing chamber 34.

The outer end of the sleeve 30 forms a seat for a pressure operated diaphragm valve 36. The latter has sealing engagement with the open end of the valve body 12 in a groove 38 outward of the passageway 28. A closure cap 40 abuts the outer side of diaphragm valve 36 adjacent the outer margin thereof and maintains said diaphragm valve in sealing engagement with the groove 38 and also closes the open end of valve body 12. A support bracket 42 has an annular portion 44 which fits over the outer lip of the closure cap 40 and over the end of valve body 12. A solenoid 46 is mounted on the outer side of the support bracket 42.

A valve member 48 which is the armature of solenoid 46 engages a central orifice 50 in the diaphragm valve 36 for closing such orifice 50 and maintaining the diaphragm valve 36 closed. Bleeder passages 52 are formed in the diaphragm to allow water to pass from one side of the diaphragm to the other and equalize the pressure on both sides of the diaphragm when the central orifice 50 is closed by the valve member 48. When this occurs, the valve will be closed by pressure on the top side of said diaphragm, because the surface area exposed to fluid pressure on the top is greater than the surface area exposed to fluid pressure on the underside thereof. Upon energization of the solenoid 46, the valve member 48 will move out of engagement with the central orifice 50, relieving pressure from the top or outer side of said diaphragm, and allowing said diaphragm valve to open by the pressure of fluid on the underside of the diaphragm. This will open the end of passageway 32 for the passage of hot water therethrough from the hot water inlet 14 into the mixing chamber 34.

The cold water inlet 16 also has a shoulder 52 on which is seated a screen 54. The inlet 16 communicates with an annular passageway 56. A sleeve 58, pressure operated diaphragm valve 60, solenoid 62, cold water passageway 64, and other related parts are situated in the same respective positions as the corresponding hot water parts at the opposite end of valve body 12. Since these cold water parts are the same and function the same as the corresponding hot water parts, they will not be explained in detail. It is believed clear that the solenoid 62 will control passage of cold water from inlet 16 into the mixing chamber 34 in the same manner as solenoid 46 controls passage of the hot water from inlet 14 into the mixing chamber 34.

The cold water inlet 16 differs in one respect from hot water inlet 14. The cold water inlet 16 has an auxiliary passageway 66 leading into one end of the mixing chamber 34 for by-passing the diaphragm valve 60 and associated passageways 56 and 64. A valve seat 68 is seated on a shoulder 70 in passageway 66. The passageway 66 is adapted to be closed by a valve member 72 having tapered side walls for engaging the valve seat 68.

A thermostatic power element 74 is positioned in the mixing chamber 34 for controlling operation of valve member 72, and thereby, to control passage of additional cold water into the mixing chamber 34. A support bracket 76 is rigidly attached to one end of power element 74 and is seated on a shoulder 78 formed in the outlet of mixing chamber 34. The support bracket 76 is held in place by the retainer 20 and outlet member 22. The power element 74 is supported at the other end of the mixing chamber 34 by a plurality of legs 80 which are attached to the power element 74 at their one end and are seated on the beveled end 82 of the mixing chamber 34 at their other end.

A thrust rod 84 is threadedly connected to valve member 72 and is integrally fastened to the base of cup member 86. The latter has an outwardly flared lip 88 under which is fitted one end of coil spring 90, the other end of the spring being on the valve seat 68. By virtue of this arrangement the valve member 72 is normally in a closed position as a result of the coil spring 90 being compressed between cup member 86, to which valve member 72 is attached, and the valve seat 68.

Thus, the valve member 72 normally will close auxiliary passageway 66 and the latter will be open only when the thermostatic power element 74 overcomes the pressure of coil spring 90 and urges the cup member 86, rod 84 and valve member 72 to the right, as seen in the figure of the drawing. The power element 74 preferably is of the type wherein a temperature sensitive deformable medium (not shown) is carried within the casing 92 and acts against a deformable member (not shown) to extend the piston 94 from a cylinder 96. The deformable medium (not shown) can be selected so that it will extend the piston 94, thereby opening passageway 66, whenever the temperature of the mixed water in the mixing chamber reaches or exceeds a predetermined degree.

Thus, in operation, the solenoids 46 and 62 will be energized to open the diaphragm valves 36 and 60 whenever it is desired to discharge a mixture of hot and cold water from outlet member 22. As long as the temperature of the mixed water remains below the temperature at which the temperature sensitive deformable medium operates to extend the piston 94, there is no temperature control of the discharged water. The valve unit then acts as a non-thermostatic mixing valve. However, if the temperature of the mixed water equals or exceeds the preselected degree, the power element 74 will act to open passageway 66 thereby introducing an additional source of cold water to the mixing chamber. Thus, the power element 74 and its associated parts function to limit the maximum temperature of the discharged mixed water. This is particularly important when washing certain synthetic materials which will be damaged if they are subjected to water temperatures above, for example 140° F. Under these circumstances the temperature sensitive deformable medium (not shown) in the power element will be selected so that the power element responds to open passageway 66 when the mixing chamber temperature reaches 140° F.

The mixing valve 10 is constructed and arranged so that the auxiliary passage 66 has its discharge end in line with the outlet member 22 so that the additional cold water will be passed into and out of the mixing chamber 34 in the most efficient and effective manner to assure that water temperatures of 140° F. or above will not be discharged from outlet member 22.

In order to avoid pressure surges and in order to keep the volume of water discharged per unit time substantially constant, a flow control annulus 98 of a conventional type is positioned in the outlet of the mixing chamber 34. This annulus 98 functions to maintain uniform rate of flow both during the time that valve member 72 is in a fully closed or open position as well as during such periods of time when the power element 74 is operating to move valve member to its open or closed position.

From the foregoing description it is believed clear that a relative simple mixing valve has been disclosed which has all the low cost features of a non-thermostatic mixing valve, and has a simply constructed thermostatic control mechanism for limiting the maximum temperature of the discharged mixed water. The valve body is designed so that it can be made as a one-piece unit and the various inlets and outlet are arranged so that installation and assembly of the various parts can be performed in a most efficient manner.

The hot and cold water inlets are arranged to provide an efficient and uniform mixing of the water, and the auxiliary cold water inlet is positioned in axial alignment with the discharge outlet so that the rapid cooling of the mixed water will occur should the temperature thereof become excessive.

Having thus described my invention, I claim:

1. A mixing valve for hot and cold water comprising a valve body having a central mixing chamber, spaced hot and cold water inlets into said body communicating with said chamber, the hot water inlet leading to one side of the chamber and the cold water inlet leading to the other side of said chamber, an outlet from said chamber intermediate said inlets, an auxiliary cold water inlet to said chamber opposite from said outlet, a thermo-sensitive element in said chamber adjacent said outlet, and a shut-off valve in said auxiliary cold water inlet operable by said thermo-sensitive element to open when the temperature of the mixed liquid leaving said outlet reaches a predetermined degree.

2. A mixing valve comprising a valve body having hot and cold water inlets, a central mixing chamber, individual shut-off valves on opposite sides of said mixing chamber for controlling the flow of hot and cold water into said mixing chamber, an auxiliary cold water inlet by-passing the first-named cold water inlet, a shut-off valve in said auxiliary cold water inlet, an outlet from said chamber substantially oppositely disposed from said auxiliary cold water inlet, a temperature-sensitive element mounted in said mixing chamber and operably connected to the auxiliary shut-off valve for opening the latter if the temperature of the mixed water exceeds a predetermined degree, and a flow control element in said outlet for delivering substantially equal quantities of water in equal intervals of time.

3. A mixing valve comprising a valve body having hot and cold water inlet passageways and an outlet passageway extending therefrom, the axes of said passageways lying in a common plane, a central elongated mixing chamber having its longitudinal axis in alignment with said outlet passageway, said inlet passageways opening into said mixing chamber oppositely from one another and normal to the longitudinal axis of the mixing chamber, an auxiliary cold water inlet in the opposite end of said mixing chamber from said outlet and in alignment therewith, a shut-off valve in said auxiliary inlet, a temperature-sensitive element mounted in said mixing chamber and operatively connected to the auxiliary shut-off valve for opening the latter if the temperature of the mixed water exceeds a predetermined degree.

4. A mixing valve comprising a valve body having hot and cold water inlet passageways and an outlet passageway extending therefrom, the axes of said passageways lying in a common plane, individual shut-off valves in each of said inlet passageways, a central elongated mixing chamber having its longitudinal axis in alignment with said outlet passageway, said inlet passageways opening into said mixing chamber oppositely from one another and normal to the longitudinal axis of the mixing chamber, an auxiliary cold water inlet in the opposite end of said mixing chamber from said outlet and in alignment therewith, a shut-off valve in said auxiliary inlet, a temperature-sensitive element mounted in said mixing chamber and operatively connected to the auxiliary shut-off valve for opening the latter if the temperature of the mixed water exceeds a predetermined degree and a flow control element in said outlet for delivering substantially equal quantities of water irrespective of fluctuations in pressure resulting from opening and closing of said auxiliary shut-off valve.

5. A mixing valve comprising a valve body having hot and cold water inlet passageways and an outlet passageway extending therefrom, the axes of said passageways lying in a common plane, individual shut-off valves in each of said inlet passageways, a central elongated mixing chamber having its longitudinal axis in alignment with said outlet pasageway, said inlet passageways opening into said mixing chamber oppositely from one another and normal to the longitudinal axis of the mixing chamber, an auxiliary cold water inlet in the opposite end of said mixing chamber from said outlet and in alignment therewith, a shut-off valve in said auxiliary inlet, a temperature-sensitive element mounted in said mixing chamber and operatively connected to the auxiliary shut-off valve for opening the latter if the temperature of the mixed water exceeds a predetermined degree said auxiliary inlet being in communication with the cold water inlet passageway by a by-pass starting upstream from the shut-off valve of the latter.

6. A mixing valve comprising a valve body having hot and cold water inlet passageways and an outlet passageway extending therefrom, the axes of said passageways lying in a common plane, individual shut-off valves in each of said inlet passageways, a central elongated mixing chamber having its longitudinal axis in alignment with said outlet passageway, said inlet passageways opening into said mixing chamber oppositely from one another and normal to the longitudinal axis of the mixing chamber, an auxiliary cold water inlet in the opposite end of said mixing chamber from said outlet and in alignment therewith, a shut-off valve in said auxiliary inlet, a temperature-sensitive element mounted in said mixing chamber and operatively connected to the auxiliary shut-off valve for opening the latter if the temperature of the mixed water exceeds a predetermined degree said auxiliary inlet being in communication with the cold water inlet passageway by a by-pass starting upstream from the shut-off valve of the latter and a flow control element in said outlet for delivering substantially equal quantities of water irrespective of fluctuations in pressure resulting from opening and closing of said auxiliary shut-off valve.

7. A mixing valve comprising a valve body having hot and cold water inlets, a central mixing chamber, individual shut-off valves on opposite sides of said mixing chamber for controlling the flow of hot and cold water from said inlets into said mixing chamber, an auxiliary cold water inlet by-passing the first-named cold water inlet, a shut-off valve in said auxiliary cold water inlet, an outlet from said chamber substantially oppositely disposed from said auxiliary cold water inlet, a thermal expansive power element mounted in said mixing chamber in axial alignment between said outlet and said auxiliary cold water inlet, said power element being operatively connected to the auxiliary shut-off valve for opening the latter if the temperature of the mixed water exceeds a predetermined degree.

8. A mixing valve comprising a valve body having hot and cold water inlets, a central mixing chamber, individual shut-off valves on opposite sides of said mixing chamber for controlling the flow of hot and cold water from said inlets into said mixing chamber, an auxiliary cold water inlet by-passing the first-named cold water inlet, a shut-off valve in said auxiliary cold water inlet, an outlet from said chamber substantially oppositely disposed from said auxiliary cold water inlet, a thermal expansive power element mounted in said mixing chamber in axial alignment between said outlet and said auxiliary cold water inlet, said power element being operatively connected to the auxiliary shut-off valve for opening the latter if the temperature of the mixed water exceeds a predetermined degree and a flow control element in said outlet for delivering substantially equal quantities of water irrespective of fluctuations in pressure resulting from opening and closing of said auxiliary shut-off valve.

References Cited in the file of this patent

UNITED STATES PATENTS

| | | |
|---|---|---|
| 2,326,096 | Dillman | Aug. 3, 1943 |
| 2,449,766 | Brown | Sept. 21, 1948 |
| 2,647,692 | Keller et al. | Aug. 4, 1953 |
| 2,708,551 | Record | May 17, 1955 |
| 2,712,324 | Lund | July 5, 1955 |